(12) United States Patent
Shi

(10) Patent No.: US 10,621,112 B2
(45) Date of Patent: Apr. 14, 2020

(54) SYSTEM AND METHOD OF IDENTIFYING A DEVICE DRIVER

(71) Applicant: Dell Products L.P., Round Rock, TX (US)

(72) Inventor: Rui Shi, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 15/880,191

(22) Filed: Jan. 25, 2018

(65) Prior Publication Data

US 2019/0227954 A1 Jul. 25, 2019

(51) Int. Cl.
*G06F 11/07* (2006.01)
*G06F 13/10* (2006.01)
*G06F 9/4401* (2018.01)

(52) U.S. Cl.
CPC .......... *G06F 13/102* (2013.01); *G06F 9/4411* (2013.01); *G06F 11/0793* (2013.01)

(58) Field of Classification Search
None
See application file for complete search history.

(56) References Cited

U.S. PATENT DOCUMENTS

| | | | | |
|---|---|---|---|---|
| 5,557,559 A * | 9/1996 | Rhodes | ............ | G01R 31/31719 324/750.05 |
| 2003/0074601 A1* | 4/2003 | Schultz | ............... | G06F 11/0772 714/15 |
| 2003/0237017 A1* | 12/2003 | Jibbe | ................... | G06F 11/0727 714/4.2 |
| 2004/0103412 A1* | 5/2004 | Rao | ............................ | G06F 8/65 717/171 |
| 2009/0282036 A1* | 11/2009 | Fedtke | ................. | G06F 21/6254 |
| 2015/0089204 A1* | 3/2015 | Henry | ................. | G06F 15/7892 712/221 |
| 2015/0089280 A1* | 3/2015 | Sade | ...................... | G06F 11/073 714/6.12 |
| 2015/0370653 A1* | 12/2015 | Scott | ................... | G06F 11/1451 714/19 |

OTHER PUBLICATIONS

Unified Extensible Firmware Interface Specification Version 2.1, Oct. 1, 2008, 1708 pages.

* cited by examiner

*Primary Examiner* — Shih-Wei Kraft
(74) *Attorney, Agent, or Firm* — Baker Botts L.L.P.

(57) ABSTRACT

In one or more embodiments, one or more systems, methods, and processes determine an address of a memory medium of an information handling system associated with an exception; determine respective address spaces of the device drivers loaded in the memory medium; determine an address space of address spaces that includes the address associated with the exception; determine a device driver of the device drivers based at least on the address space; query the device driver for an identification of the device driver; determine if the device driver provides the identification of the device driver; if the device driver provides the identification of the device driver, output the identification of the device driver and exception information associated with the exception; and if the device driver does not provide the identification of the device driver, search for identification information of the device driver within the address space.

18 Claims, 4 Drawing Sheets

SYSTEM AND METHOD OF IDENTIFYING A DEVICE DRIVER

BACKGROUND

Field of the Disclosure

This disclosure relates generally to information handling systems and more particularly to identifying device drivers executing on information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may determine that an exception occurred; may determine an address of a memory medium of an information handling system associated with the exception; may determine device drivers loaded in the memory medium of the information handling system; may determine respective address spaces of the device drivers; may determine an address space of the address spaces that includes the address of the memory medium of the information handling system associated with the exception; may determine a device driver of the device drivers based at least on the address space; may query the device driver for an identification of the device driver; and may determine if the device driver provides the identification of the device driver. If the device driver provides the identification of the device driver, the one or more systems, methods, and/or processes may output the identification of the device driver and exception information associated with the exception. If the device driver does not provide the identification of the device driver the one or more systems, methods, and/or processes: may search for identification information of the device driver within the address space; may determine the identification information associated with the device driver; and may output the identification information of the device driver and exception information associated with the exception. In one or more embodiments, searching for the identification of the device driver within the address space may include searching for a string of American Standard Code for Information Interchange (ASCII) characters. In one example, searching for the string of ASCII characters may include searching for copyright information. In a second example, searching for the string of ASCII characters may include starting a search at a beginning of the address space. In another example, all characters of the string of ASCII characters may be printable. In one or more embodiments, determining if the device driver provides the identification of the device driver may include determining if the device driver supports Efi Component Name2 Protocol.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
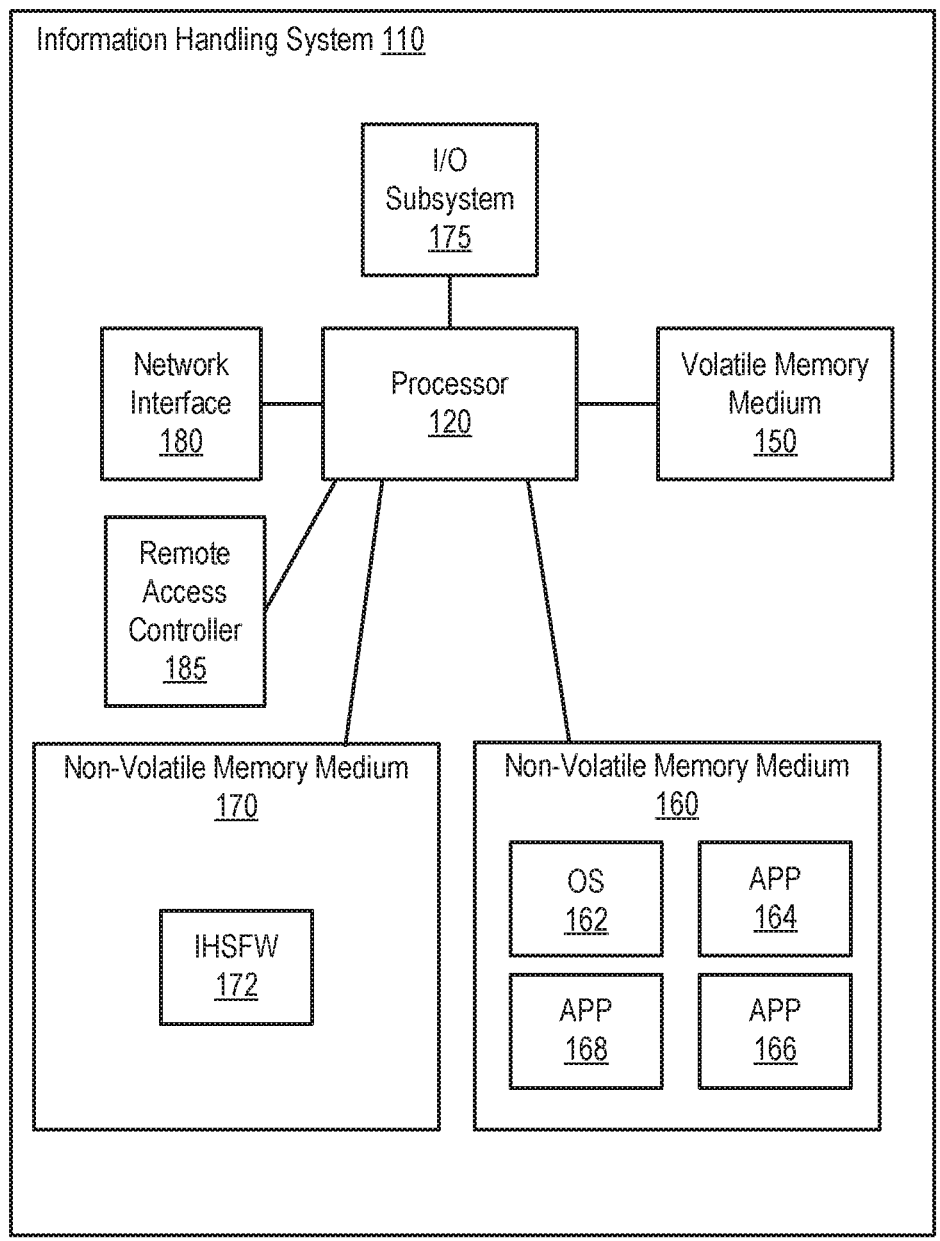
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a debugger tool may handle one or more processor exceptions. For example, the debugger tool may be included in information handling system firmware. In one or more embodiments, if the processor is not able to execute a next instruction due to an error, the processor may transfer instruction execution to the debugger tool. For example, the error may be or include one or more of a failed assert, an invalid pointer, an invalid pointer dereference, and a memory corruption, among others. In one or more embodiments, the debugger tool may gather information associated with one or more states of an information handling system. For example, the information may be displayed via a display, may be provided to a serial port, may be provided to a storage device (e.g., a memory medium), and/or may be provided to a remote access controller. For instance, the remote access controller may be or include an integrated Dell Remote Access Controller (iDRAC). In one or more embodiments, the remote access controller may log the information. For example, more detailed information may be provided to the serial port, the storage device, and/or the remote access controller than to the display.

In one or more embodiments, the information associated with the one or more states of the information handling system may include an exception reason (e.g., a crash reason), source information, a snapshot of one or more registers (e.g., general purpose registers, etc.), one or more previous branch records, previous branch information, a call stack up to the exception, a stack dump, a list of one or more Unified Extensible Firmware Interface events triggered prior to the exception, and/or a list of one or more firmware drivers currently stored by a memory medium of the information handling system, among others.

In one or more embodiments, one or more portions of the information associated with the one or more states of the information handling system may not be associated with an identifiable attribute associated with the information handling system. For example, "unknown" may be associated with a device driver name in the one or more previous branch records, the previous branch information, the call stack up to the exception, and/or the list of one or more firmware drivers currently stored by the memory medium, among others. For instance, one or more "unknowns" may be associated with one or more third-party device drivers, one or more third-party applications, and/or third-party boot loader instructions, among others. In one or more embodiments, the one or more "unknowns" may not be associated with available symbols. For example, an available symbol may include a string of characters and/or another type of identification, which may be utilized in identifying the one or more third-party device drivers, the one or more third-party applications, and/or the third-party boot loader instructions, among others. In one instance, one or more symbols may not be available to the debugger tool. In another instance, the one or more third-party device drivers, the one or more third-party applications, and/or the third-party boot loader instructions, among others, may have been compiled without one or more symbols.

In one or more embodiments, the one or more third-party device drivers, the one or more third-party applications, and/or the third-party boot loader instructions, among others, may be associated with one or more hardware components of the information handling system. For example, a hardware component of the one or more hardware components may have been added to the information handling system. For instance, one or more hardware components that may have been added to the information handling system may include one or more of a network interface card, a SAS (serial attached SCSI (Small Computer System Interface)) card, a serial AT attachment (SATA) card, a RAID (redundant array of independent disks) card, and a storage device, among others.

In one or more embodiments, an unknown attribute and/or an unknown portion of the information associated with the one or more states of the information handling system may be determined. For example, if an attribute and/or a portion of the information associated with the one or more states of the information handling system is determined to be "unknown", the debugging tool may automatically determine information associated with the "unknown" attribute and/or the "unknown" portion. For instance, this may aid testers and/or other information technology personnel to identify one or more malfunctioning portions of the information handling system, rather than having the testers and/or other information technology personnel spend time in trying to reproduce and manually decode the one or more malfunctioning portions of the information handling system.

In one or more embodiments, an address in memory, of the information handling system, associated with an "unknown" driver may be determined. If the "unknown" driver supports Efi Component Name2 Protocol, Efi Component Name2 Protocol may be utilized in determining identification information associated with the "unknown" driver. In one or more embodiments, if an "unknown" driver is determined, a list of loaded firmware images of the information handling system may be determined. For example, a memory location of a firmware image associated with the "unknown" driver may be determined. In one instance, if a user readable name associated with the driver is retrievable, based at least on the memory location, the user readable name is retrieved. In another instance, if a user readable name associated with the driver is not retrievable, memory may be scanned, based at least on the memory location, for one or more strings (e.g., user readable strings).

Turning now to FIG. 1, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and a remote access controller 185. As illustrated, volatile memory medium 150, non-volatile memory media 160 and 170, I/O subsystem 175, network interface 180, and remote access controller 185 may be communicatively coupled to processor 120.

In one or more embodiments, one or more of volatile memory medium 150, non-volatile memory media 160 and 170, I/O subsystem 175, network interface 180, and remote access controller 185 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2:
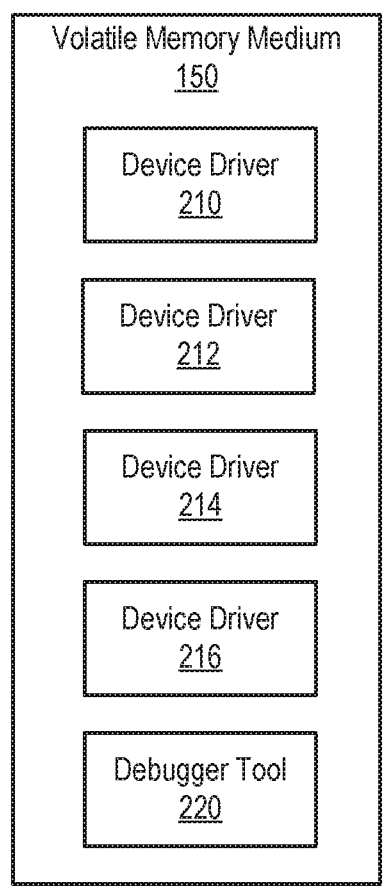
FIG. 2 illustrates example device drivers and an example debugger tool, according to one or more embodiments.

Turning now to FIG. 2, example device drivers and an example debugger tool are illustrated, according to one or more embodiments. As shown, volatile memory medium 150 may include device drivers 210-216. In one or more embodiments, each of device drivers 210-216 may be associated with an address space of volatile memory medium 150. For example, an address space may include a number of bytes of volatile memory medium 150 allocated to the address space. In one instance, the address space may be associated with a beginning address of volatile memory medium 150. In another instance, the address space may be associated with an ending address of volatile memory medium 150. As illustrated, volatile memory medium 150 may include a debugger tool 220. In one or more embodiments, debugger tool 220 may include instructions executable by processor 120. For example, processor 120 may execute debugger tool 220. For instance, processor 120 may execute debugger tool 220 after an exception occurs and/or is detected.

Figure 3:
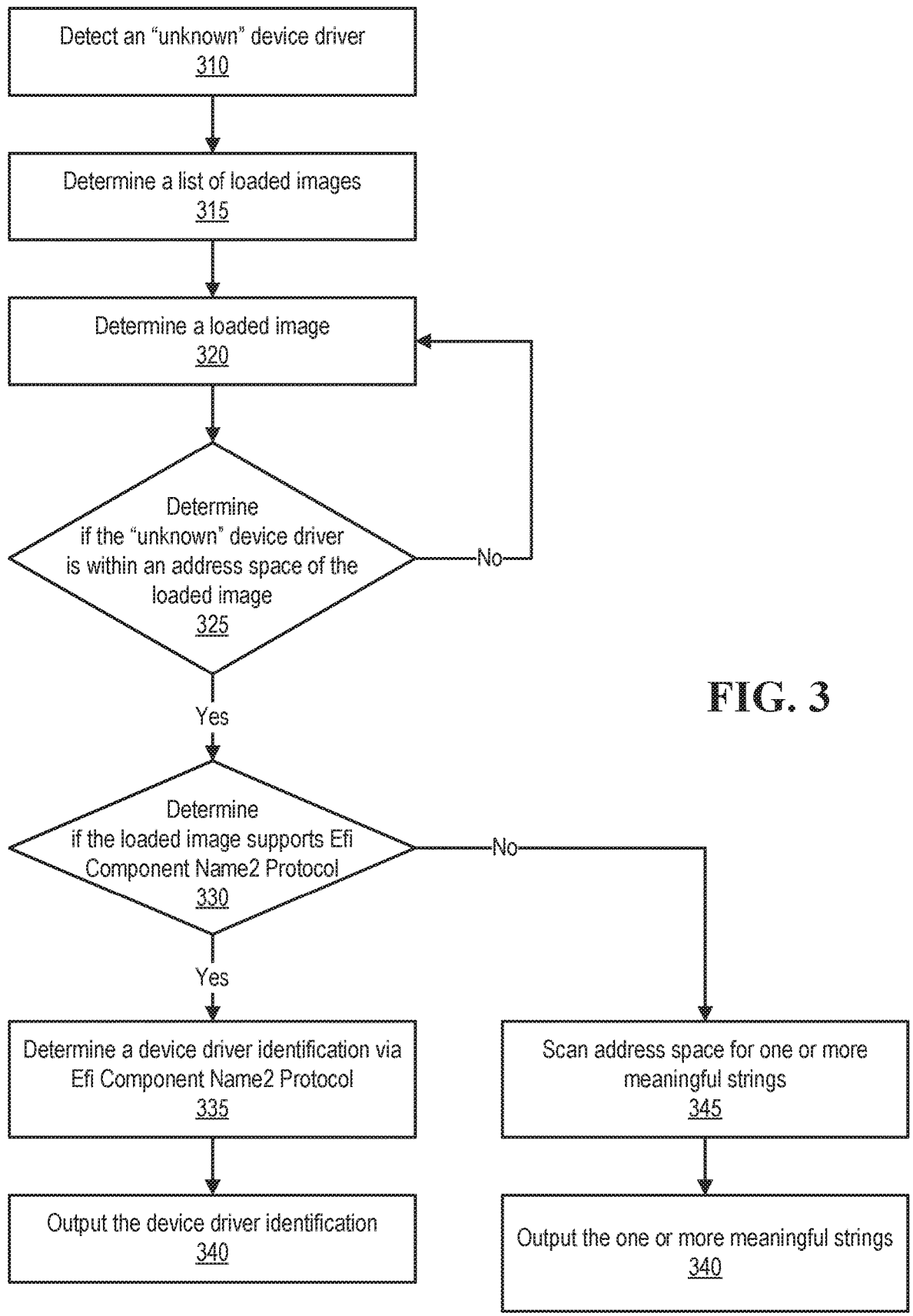
FIG. 3 illustrates an example method of determining information associated with a device driver, according to one or more embodiments.

Turning now to FIG. 3, an example method is illustrated, according to one or more embodiments. At 310, an "unknown" device driver may be detected. For example, debugger tool 220 may detect an "unknown" device driver. For instance, debugger tool 220 may not have access to symbols of the "unknown" device driver. In one or more embodiments, if processor 120 is not able to execute a next instruction due to an error, processor 120 may transfer instruction execution to debugger tool 220. For example, the error may be or include one or more of a failed assert, an invalid pointer, an invalid pointer dereference, and a memory corruption, among others. In one or more embodiments, debugger tool 220 may gather information associated with one or more states of IHS 110. For example, the information may be displayed via a display, may be provided to a serial port, may be provided to a storage device (e.g., a memory medium), and/or may be provided to a remote access controller (e.g., remote access controller 185). For instance, the remote access controller may be or include an iDRAC. In one or more embodiments, the remote access controller may log the information. For example, more detailed information may be provided to the serial port and/or the remote access controller than to the display.

At 315, a list of loaded images may be determined. For example, debugger tool 220 may determine a list of loaded images. In one or more embodiments, the list of loaded images may include address spaces of device drivers. For example, the address spaces may correspond to address spaces of device drivers 210-216. At 320, a loaded image may be determined. For example, debugger tool 220 may determine a loaded image from the list of loaded images.

At 325, it may be determined if the "unknown" device driver is within an address space of the loaded image. For example, debugger tool 220 may determine if the "unknown" device driver is within an address space of the loaded image. In one or more embodiments, determining if the "unknown" device driver is within an address space of the loaded image may include determining if an instruction that caused an exception is within the address space of the loaded image.

If the "unknown" device driver is not within the address space of the loaded image, the method may proceed to 320, where another loaded image may be determined, according to one or more embodiments. If the "unknown" device driver is within the address space of the loaded image, it may be determined if the loaded image supports Efi Component Name2 Protocol, at 330. For example, debugger tool 220 may determine if the loaded image supports Efi Component Name2 Protocol.

If the loaded image supports Efi Component Name2 Protocol, a device driver identification may be determined via Efi Component Name2 Protocol, at 335. In one example, the device driver identification may include a name. For instance, the name may include a name of the device driver. In another instance, the name may include a name of an author (e.g., a person, a company, etc.) of the device driver. In one or more embodiments, debugger tool 220 may determine the device driver identification may be determined via Efi Component Name2 Protocol. At 340, the device driver identification may be outputted. For example, debugger tool 220 may output the device driver identification. For instance, debugger tool 220 may output the device driver identification to one or more of a display, a serial port, a storage device, and a remote access controller (e.g., remote access controller 185), among others.

If the loaded image does not support Efi Component Name2 Protocol, an address space may be scanned for one or more meaningful strings, at 345. For example, debugger tool 220 may scan an address space of the loaded image, which is associated with the "unknown" device driver, for one or more meaningful strings. In one or more embodiments, a meaningful string may include American Standard Code for Information Interchange (ASCII) characters. For example, a meaningful string may be or include a series of printable ASCII characters. In one example, the series of printable ASCII characters may include an author name (e.g., a name of a person, a company name, etc.). In a second instance, the series of printable ASCII characters may include a physical address. In a third instance, the series of printable ASCII characters may include a telephone number. In another instance, the series of printable ASCII characters may include copyright information. In one or more embodiments, the copyright information may include one or more of a name (e.g., a name of a person, a company name, etc.) and a year, among others.

At 340, the one or more meaningful strings may be outputted. For example, debugger tool 220 may output the one or more meaningful strings. For instance, debugger tool 220 may output the one or more meaningful strings to one or more of a display, a serial port, a storage device, and a remote access controller (e.g., remote access controller 185), among others.

Figure 4:
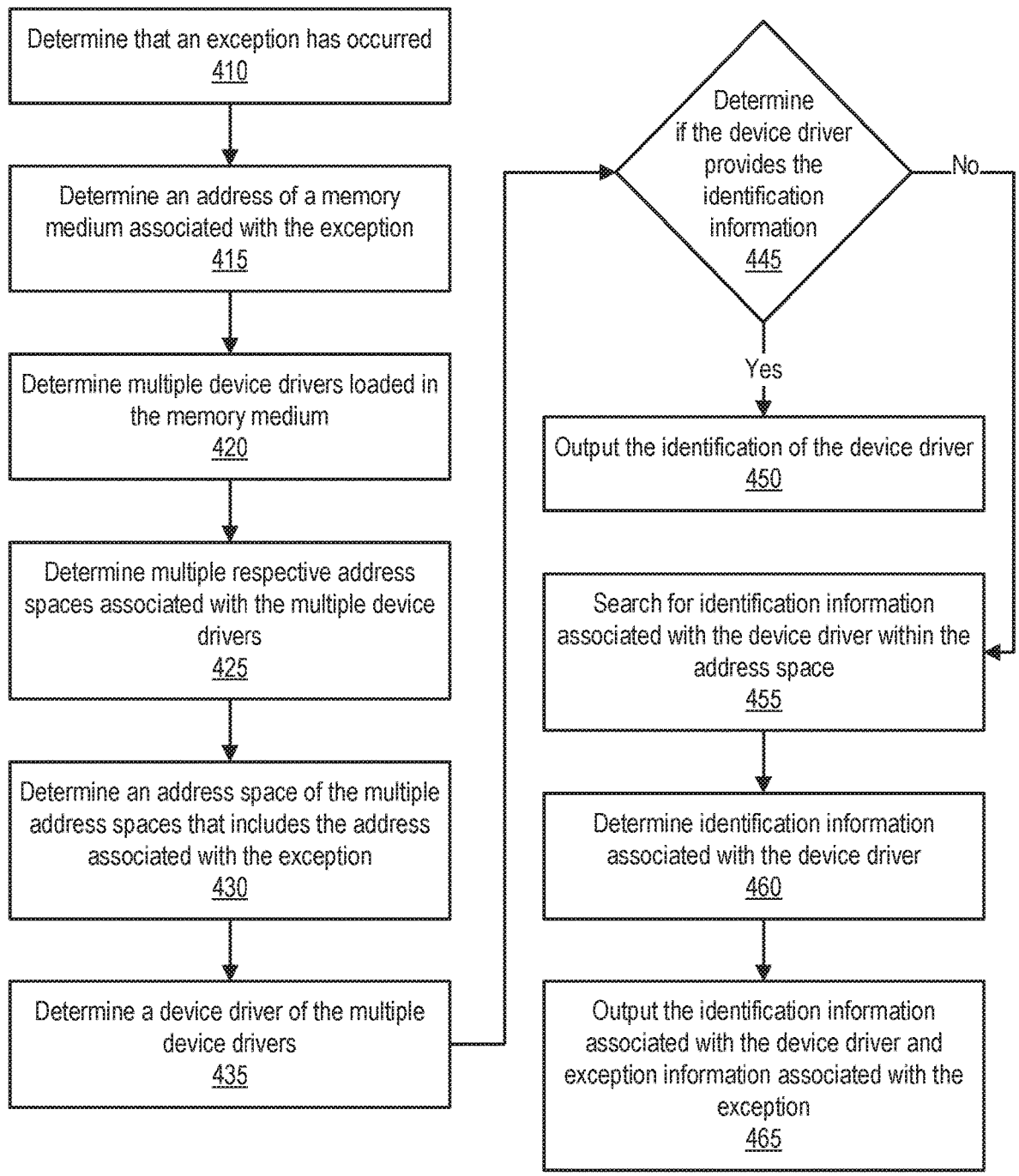
FIG. 4 illustrates another example method of determining information associated with a device driver, according to one or more embodiments.

Turing now to FIG. 4, another example method is illustrated, according to one or more embodiments. At 410, it may be determined that an exception has occurred. For example, processor 120 may determine that an exception has occurred. At 415, an address of a memory medium associated with the exception may be determined. For example, debugger tool 220 may determine an address of volatile memory medium 150 associated with the exception. At 420, multiple device drivers loaded in the memory medium may be determined. For example, debugger tool 220 may determine multiple device drivers loaded in the memory medium. For instance, debugger tool 220 may determine two or more of device drivers 210-216 loaded in memory medium 150.

At 425, multiple respective address spaces associated with the multiple device drivers may be determined. For example, debugger tool 220 may determine multiple respective address spaces associated with the multiple device drivers. For instance, debugger tool 220 may determine multiple respective address spaces associated with the two or more of device drivers 210-216. At 430, an address space of the multiple address spaces that includes the address of the memory medium associated with the exception may be determined. For example, debugger tool 220 may determine an address space of the multiple address spaces that includes the address of the memory medium associated with the exception.

At 435, a device driver of the multiple device drivers, based at least on the address space, may be determined. For example, debugger tool 220 may determine, based at least on the address space, a device driver of the multiple device drivers. In one or more embodiments, determining a device driver of the multiple device drivers, based at least on the address space, may include determining that the address space of the device driver includes the address associated with the exception. At 440, the device driver may be queried for an identification of the device driver. For example, debugger tool 220 may query the device driver for an identification of the device driver. In one or more embodiments, the device driver may be queried for an identification of the device driver based at least on an address space of the device driver.

At 445, it may be determined if the device driver provides the identification of the device driver. For example, debugger tool 220 may determine if the device driver provides the identification of the driver. In one or more embodiments, determining if the device driver provides the identification of the driver may include determining if the device driver supports Efi Component Name2 Protocol. If the device driver provides the identification of the device driver, the identification of the driver may be outputted, at 450. For example, debugger tool 220 may output the identification of the driver and exception information associated with the exception. In one instance, the identification of the driver and the exception information associated with the exception may be outputted via one or more of a display, a serial port, and a remote access controller (e.g., remote access controller 185), among others. In another instance, outputting the identification of the driver and the exception information associated with the exception may include storing the identification of the driver and the exception information associated with the exception via a memory medium.

If the device driver does not provide the identification of the device driver, identification information associated with the device driver may be search for, within the address space, at 455. For example, debugger tool 220 may search for, within the address space, identification information associated with the device driver. In one or more embodiments, searching for information associated with the device driver may begin at a starting address and/or a beginning of the address space. For example, searching for information associated with the device driver may include starting a search at a beginning of the address space. In one or more embodiments, searching for information associated with the device driver may include searching for a string of ASCII characters. For example, searching for the string of ASCII characters may include searching for copyright information.

At 460, identification information associated with the device driver may be determined. For example, debugger tool 220 may determine identification information associated with the device driver. In one or more embodiments, identification information associated with the device driver may be or include a series of printable ASCII characters (e.g., ASCII character associated with base-ten byte values of thirty-two through one hundred and seventy-six). In one example, the series of printable ASCII characters may include an author name (e.g., a name of a person, a company name, etc.). In a second instance, the series of printable ASCII characters may include a physical address. In a third instance, the series of printable ASCII characters may include a telephone number. In another instance, the series of printable ASCII characters may include copyright information. In one or more embodiments, the copyright information may include one or more of a name (e.g., a name of person, a company name, etc.) and a year, among others. In one or more embodiments, determining identification information associated with the device driver may include determining printable ASCII characters before and/or after the word "copyright". In one example, the word "copyright" may be searched for, case sensitive or case insensitive, and printable ASCII characters before and/or after the word "copyright" may be determined as identification information associated with the device driver. In another example, the string "(C)" may be searched for, case sensitive or case insensitive, and printable ASCII characters before and/or after the string "(C)" may be determined as identification information associated with the device driver.

At 465, the identification information associated with the device driver and the exception information associated with the exception may be outputted. For example, debugger tool 220 may output the identification information associated with the device driver and the exception information associated with the exception. In one instance, the identification information associated with the device driver and the exception information associated with the exception may be outputted via one or more of a display, a serial port, and a remote access controller (e.g., remote access controller 185), among others. In another instance, outputting the identification information associated with the device driver and the exception information associated with the exception may include storing the identification information associated with the device driver and the exception information associated with the exception via a memory medium. In one or more embodiments, the exception information associated with the exception may include an exception reason (e.g., a crash reason), source information, a snapshot of one or more registers (e.g., general purpose registers, etc.), one or more previous branch records, previous branch information, a call stack up to the exception, a stack dump, a list of one or more Unified Extensible Firmware Interface events triggered prior to the exception, and/or a list of one or more firmware drivers currently stored by a memory medium of the information handling system, among others.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium that is coupled to the at least one processor and that includes processor instructions executed by the at least one processor to cause the information handling system to:
      determine that an exception occurred, wherein at least one of an invalid pointer, an invalid pointer dereference, and a memory corruption causes the exception;
      determine a particular address of the memory medium associated with the exception;
      determine a plurality of device drivers loaded in the memory medium;
      identify a plurality of respective address spaces of the plurality of device drivers;
      determine an address space of the plurality of address spaces that includes the particular address of the memory medium associated with the exception;
      identify a particular device driver of the plurality of device drivers based at least on the particular address space;
      query the particular device driver for an identification of the particular device driver;
      in response to the query, determine whether the particular device driver provides the identification of the particular device driver;
      in response to determining that the particular device driver provides the identification of the particular device driver, output the identification of the particular device driver and exception information associated with the exception, the exception information including information associated with one or more states of the information handling system;
      in response to determining that the particular device driver does not provide the identification of the particular device driver:
         search for identification information of the particular device driver within the address space;
         determine the identification information associated with the particular device driver; and
         output the identification information of the particular device driver and the exception information associated with the exception, including outputting the information associated with the one or more states of the information handling system; and
      wherein the information associated with the one or more states of the information handling system includes one or more of an exception reason, source information, a snapshot of one or more registers, one or more previous branch records, previous branch information, a call stack up to the exception, a stack dump, a list of one or more Unified Extensible Firmware Interface events triggered prior to the exception, and a list of one or more firmware drivers currently stored by the memory medium of the information handling system.

2. The information handling system of claim 1, wherein, to search for the identification information associated with the particular device driver within the particular address space, the processor instructions further cause the information handling system to search for a string of American Standard Code for Information Interchange (ASCII) characters.

3. The information handling system of claim 2, wherein, to search for the string of ASCII characters, the processor instructions further cause the information handling system to search for copyright information.

4. The information handling system of claim 2, wherein, to search for the string of ASCII characters, the processor instructions further cause the information handling system to start a search at a beginning of the address space.

5. The information handling system of claim 2, wherein all characters of the string of ASCII characters are printable.

6. The information handling system of claim 1, wherein, in response to determining that the particular device driver provides the identification of the particular device driver, the processor instructions further cause the information handling system to determine that the particular device driver supports Efi Component Name2 Protocol.

7. A method, comprising:
   determining that an exception occurred, wherein at least one of an invalid pointer, an invalid pointer dereference, and a memory corruption causes the exception;
   determining a particular address of a memory medium of an information handling system associated with the exception;
   determining a plurality of device drivers loaded in the memory medium of the information handling system;
   identify a plurality of respective address spaces of the plurality of device drivers;
   determine an address space of the plurality of address spaces that includes the particular address of the memory medium associated with the exception;
   identifying a particular device driver of the plurality of device drivers based at least on the particular address space;
   querying the particular device driver for an identification of the particular device driver;

in response to the query, determining whether the particular device driver provides the identification of the particular device driver;

in response to determining that the particular device driver provides the identification of the particular device driver, output the identification of the particular device driver and exception information associated with the exception, the exception information including information associated with one or more states of the information handling system;

in response to determining that the particular device driver does not provide the identification of the particular device driver:
searching for the identification of the particular device driver within the address space;
determining the identification of the particular device driver; and
outputting the identification of the particular device driver and the exception information associated with the exception, including outputting the information associated with the one or more states of the information handling system; and wherein the information associated with the one or more states of the information handling system includes one or more of an exception reason, source information, a snapshot of one or more registers, one or more previous branch records, previous branch information, a call stack up to the exception, a stack dump, a list of one or more Unified Extensible Firmware Interface events triggered prior to the exception, and a list of one or more firmware drivers currently stored by the memory medium of the information handling system.

8. The method of claim 7, wherein the searching for the identification of the particular device driver within the particular address space includes searching for a string of American Standard Code for Information Interchange (ASCII) characters.

9. The method of claim 8, wherein the searching for the string of ASCII characters, includes searching for copyright information.

10. The method of claim 8, wherein the searching for the string of ASCII characters, includes starting a search at a beginning of the address space.

11. The method of claim 8, wherein all characters of the string of ASCII characters are printable.

12. The method of claim 7, wherein, in response to determining that the particular device driver provides the identification of the particular device driver includes determining if the device driver supports Efi Component Name2 Protocol.

13. A computer-readable non-transitory memory medium that includes processor instructions executed by at least one processor of an information handling system to cause the information handling system to:

determine that an exception occurred, wherein at least one of an invalid pointer, an invalid pointer dereference, and a memory corruption causes the exception;

determine a particular address of the memory medium associated with the exception;

determine a plurality of device drivers loaded in the memory medium;

identify a plurality of respective address spaces of the plurality of device drivers;

determine an address space of the plurality of address spaces that includes the particular address of the memory medium associated with the exception;

identify a particular device driver of the plurality of device drivers based at least on the particular address space;

query the particular device driver for an identification of the particular device driver;

in response to the query, determine whether the particular device driver provides the identification of the particular device driver;

in response to determining that the particular device driver provides the identification of the particular device driver, output the identification of the particular device driver and exception information associated with the exception, the exception information including information associated with one or more states of the information handling system;

in response to determining that the particular device driver does not provide the identification of the particular device driver:
search for identification information of the particular device driver within the address space;
determine the identification information associated with the particular device driver; and
output the identification information of the particular device driver and the exception information associated with the exception, including outputting the information associated with the one or more states of the information handling system; and wherein the information associated with the one or more states of the information handling system includes one or more of an exception reason, source information, a snapshot of one or more registers, one or more previous branch records, previous branch information, a call stack up to the exception, a stack dump, a list of one or more Unified Extensible Firmware Interface events triggered prior to the exception, and a list of one or more firmware drivers currently stored by the memory medium of the information handling system.

14. The computer-readable non-transitory memory medium of claim 13, wherein, to search for the identification information associated with the particular device driver within the particular address space, the processor instructions further cause the information handling system to search for a string of American Standard Code for Information Interchange (ASCII) characters.

15. The computer-readable non-transitory memory medium of claim 14, wherein, to search for the string of ASCII characters, the processor instructions further cause the information handling system to search for copyright information.

16. The computer-readable non-transitory memory medium of claim 14, wherein, to search for the string of ASCII characters, the processor instructions further cause the information handling system to start a search at a beginning of the address space.

17. The computer-readable non-transitory memory medium of claim 14, wherein all characters of the string of ASCII characters are printable.

18. The computer-readable non-transitory memory medium of claim 13, wherein, in response to determining that the device driver provides the identification of the particular device driver, the processor instructions further cause the information handling system to determine that the particular device driver supports Efi Component Name2 Protocol.

* * * * *